US010412668B2

United States Patent
Goto (10) Patent No.: US 10,412,668 B2
(45) Date of Patent: Sep. 10, 2019

(54) COMMUNICATION APPARATUS, COMMUNICATION METHOD, AND STORAGE MEDIUM

(71) Applicant: CANON KABUSHIKI KAISHA, Tokyo (JP)

(72) Inventor: Fumihide Goto, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 4 days.

(21) Appl. No.: 15/495,846

(22) Filed: Apr. 24, 2017

(65) Prior Publication Data
US 2017/0318524 A1    Nov. 2, 2017

(30) Foreign Application Priority Data

Apr. 28, 2016   (JP) .................................. 2016-091614

(51) Int. Cl.
| H04W 4/00 | (2018.01) |
| H04W 48/20 | (2009.01) |
| H04W 76/11 | (2018.01) |
| H04W 84/12 | (2009.01) |
| H04W 76/30 | (2018.01) |

(52) U.S. Cl.
CPC ............ *H04W 48/20* (2013.01); *H04W 76/11* (2018.02); *H04W 76/30* (2018.02); *H04W 84/12* (2013.01)

(58) Field of Classification Search
None
See application file for complete search history.

(56) References Cited

U.S. PATENT DOCUMENTS

| 2015/0173109 | A1* | 6/2015 | Venkatesan | H04W 76/02 370/338 |
| 2015/0241920 | A1* | 8/2015 | Kakani | H04W 4/80 710/303 |
| 2015/0351018 | A1* | 12/2015 | Kim | H04W 48/16 370/338 |
| 2015/0351146 | A1* | 12/2015 | Lee | H04W 76/023 370/329 |
| 2015/0373765 | A1* | 12/2015 | Lee | H04W 76/14 370/329 |
| 2016/0234301 | A1* | 8/2016 | Qi | H04W 8/005 |
| 2018/0124654 | A1* | 5/2018 | Kim | H04W 36/0027 |

FOREIGN PATENT DOCUMENTS

JP     2011-35768 A    2/2011

* cited by examiner

*Primary Examiner* — Farah Faroul
(74) *Attorney, Agent, or Firm* — Canon U.S.A., Inc., IP Division (57) ABSTRACT

After a communication apparatus establishes a session with another communication apparatus via a first access point, the communication apparatus stores address information of the communication apparatus and the other communication apparatus, identification information of a service, identification information of the session, and status information of the session. When a condition for switching from the first access point to a second access point occurs, the communication apparatus disconnects from the first access point and connects to the second access point. The communication apparatus then establishes a session with the other communication apparatus via the second access point, using the address information of the communication apparatus and the other communication apparatus, the identification information of the service, the identification information of the session, and the status information of the session stored by a storage unit.

19 Claims, 10 Drawing Sheets

ACCESS POINT C

ACCESS POINT D

MOBILE PHONE B

CAMERA A

COMMUNICATION APPARATUS, COMMUNICATION METHOD, AND STORAGE MEDIUM

BACKGROUND

Field

The present disclosure relates to a communication technique.

Description of the Related Art

With the recent increase in the number of electronic apparatuses such as digital cameras and printers including wireless local area network (LAN) functions, wireless LAN communication is performed by using such electronic apparatuses as a communication apparatus. Japanese Patent Application Laid-Open No. 2011-35768 discusses a technique in which a digital camera including a wireless LAN function shares images with another apparatus via wireless LAN communication. In order for a communication apparatus to communicate with another communication apparatus via a wireless LAN to execute a service such as image share processing and print processing, the communication apparatus connects with another communication apparatus via a wireless LAN and then establishes a session for the target service with another communication apparatus.

In order for a communication apparatus to perform communication with another communication apparatus via a wireless LAN, the communication apparatus can utilize such communication methods as communication using an access point as a relay apparatus and direct communication without using an access point.

In wireless LAN communication, the access point or communication method in use can be switched depending on a wireless LAN communication status or by a user operation. While, in such a case, wireless LAN communication between the communication apparatus and another communication apparatus will be disconnected, the session established on the wireless LAN before switching will also be ended following the disconnection. In a conventional manner, therefore, when the access point or wireless LAN communication method in use is switched, the communication apparatus needs to establish a new session with another communication apparatus on the wireless LAN after switching. In other words, when the access point or wireless LAN communication method in use is switched, the session established before switching cannot be continued after switching.

What is needed is to enable continuing a session, once established, to execute a service even when the access point or wireless communication method in use is switched.

SUMMARY

According to an aspect of the present invention, a communication apparatus includes a first connection unit configured to connect to a first access point, a first establishment unit configured to, to execute a service between the communication apparatus and another communication apparatus, share address information of the communication apparatus and the another communication apparatus, identification information of a service, and identification information of a session, and establish a session with the another communication apparatus via the first access point connected by the first connection unit, a detection unit configured to detect an occurrence of a condition for switching from the first access point to a second access point after establishing a session with the another communication apparatus by the first establishment unit, a storage unit configured to store the address information of the communication apparatus and the another communication apparatus, the identification information of the service, the identification information of the session, and status information of the session, a disconnection unit configured to disconnect from the first access point based on the detection by the detection unit, a second connection unit configured to connect to the second access point after the disconnection by the disconnection unit, and a second establishment unit configured to, to continue the service between the communication apparatus and the another communication apparatus, establish a session with the another communication apparatus via the second access point connected by the second connection unit, using the address information of the communication apparatus and the another communication apparatus, the identification information of the service, the identification information of the session, and the status information of the session stored by the storage unit.

According to another aspect of the present invention, a communication apparatus includes a first connection unit configured to connect to a first access point, a first establishment unit configured to, to execute a service between the communication apparatus and the another communication apparatus, share address information of the communication apparatus and the another communication apparatus, identification information of a service, and identification information of a session, and establish a session with the another communication apparatus via the first access point connected by the first connection unit, a detection unit configured to detect an occurrence of a condition for switching from a communication method using the first access point to a communication method for communicating directly with the another communication apparatus after establishing the session with the another communication apparatus by the first establishment unit, a storage unit configured to store the address information of the communication apparatus and the another communication apparatus, the identification information of the service, the identification information of the session, and status information of the session, a disconnection unit configured to disconnect from the first access point based on the detection by the detection unit, a second connection unit configured to connect with the another communication apparatus after the disconnection by the disconnection unit, and a second establishment unit configured to, to continue the service between the communication apparatus and the another communication apparatus, establish a session with the another communication apparatus connected by the second connection unit, using the address information of the communication apparatus and the another communication apparatus, the identification information of the service, the identification information of the session, and the status information of the session stored by the storage unit.

Further features will become apparent from the following description of exemplary embodiments with reference to the attached drawings.

DESCRIPTION OF THE EMBODIMENTS

A communication apparatus according to a first exemplary embodiment will be described in detail below with reference to the accompanying drawings. An example using a wireless local area network (LAN) system conforming to the Institute of Electrical and Electronics Engineers, Inc. (IEEE) 802.11 series will be described below. However, a communication configuration is not limited to a wireless LAN conforming to the IEEE 802.11 series.

Figure 1:
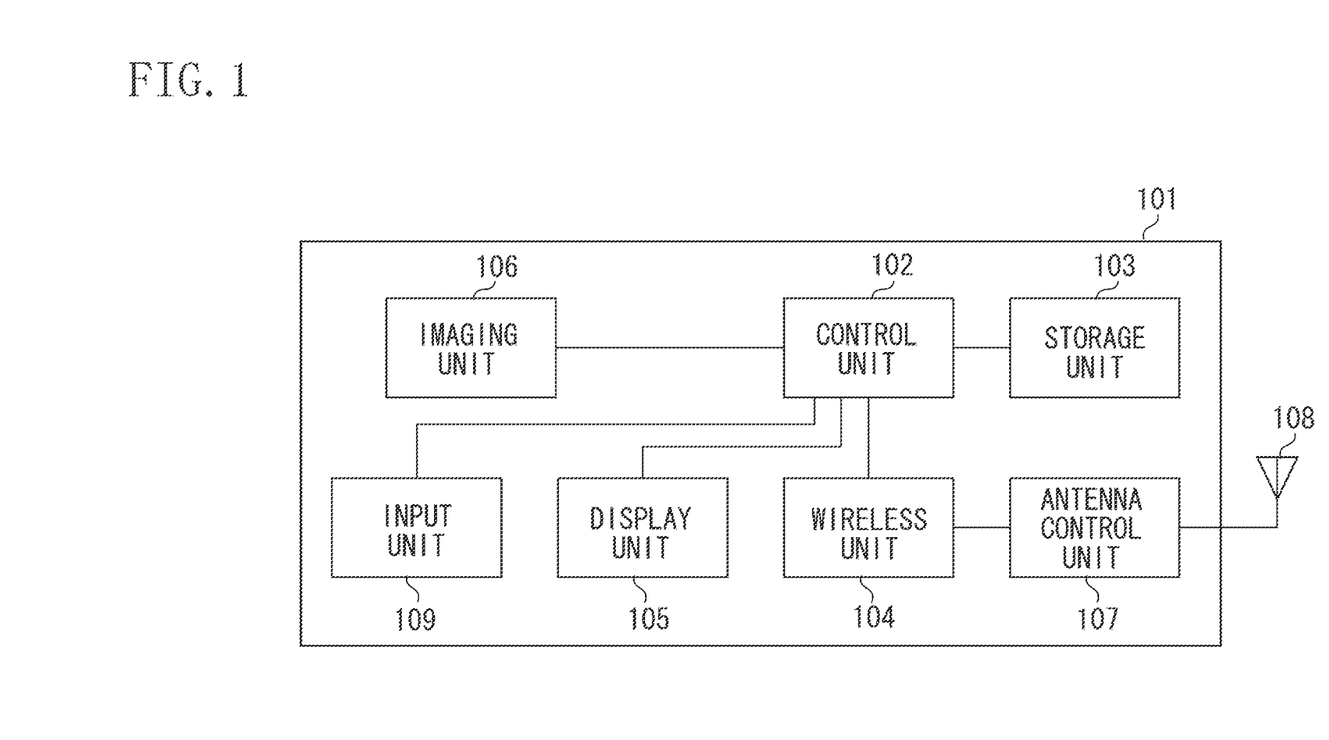
FIG. 1 is a block diagram illustrating a hardware configuration of a communication apparatus according to an exemplary embodiment.

FIG. 1 is a block diagram illustrating a hardware configuration of the communication apparatus according to the present exemplary embodiment. Referring to FIG. 1, a communication apparatus 101 includes a control unit 102 for controlling the entire communication apparatus 101 by executing a control program stored in a storage unit 103. The control unit 102 includes a central processing unit (CPU). The storage unit 103 stores various information including control programs to be executed by the control unit 102, image data, and communication parameters. Various operations (described below) are implemented when the control unit 102 executes a control program stored in the storage unit 103. The storage unit 103 includes storage media such as a read only memory (ROM), random access memory (RAM), hard disk drive (HDD), flash memory, and detachably attached secure digital (SD) card.

A wireless unit 104 performs wireless LAN communication conforming to the IEEE 802.11 series. The wireless unit 104 includes a chip for performing wireless communication. A display unit 105 displays various information. The display unit 105 can be a liquid crystal display (LCD) or a light emitting diode (LED) display including a function of outputting visually recognizable information, and can also include a speaker for outputting sound. The display unit 105 includes a function of outputting at least one of visual information or audio information. When displaying visual information, the display unit 105 includes a video RAM (VRAM) for storing image data corresponding to visual information to be displayed. The display unit 105 performs display control for continuing displaying image data stored in the VRAM on an LCD or LED display.

An imaging unit 106 includes an image sensor and lens, and captures a still image (photograph) or a moving image. An antenna control unit 107 performs output control on an antenna 108 that performs communication in a frequency band (for example, a 2.4- and/or 5-GHz bandwidth) for wireless LAN communication. An input unit 109 enables a user to input various information to operate the communication apparatus 101. The input unit 109 stores a flag corresponding to an input in a memory as the storage unit 103. The hardware configuration illustrated in FIG. 1 is merely an example, and the communication apparatus 101 can include other hardware configurations. For example, when the communication apparatus 101 is a printer, the communication apparatus 101 can include a printing unit in addition to the hardware components illustrated in FIG. 1.

Figure 2:
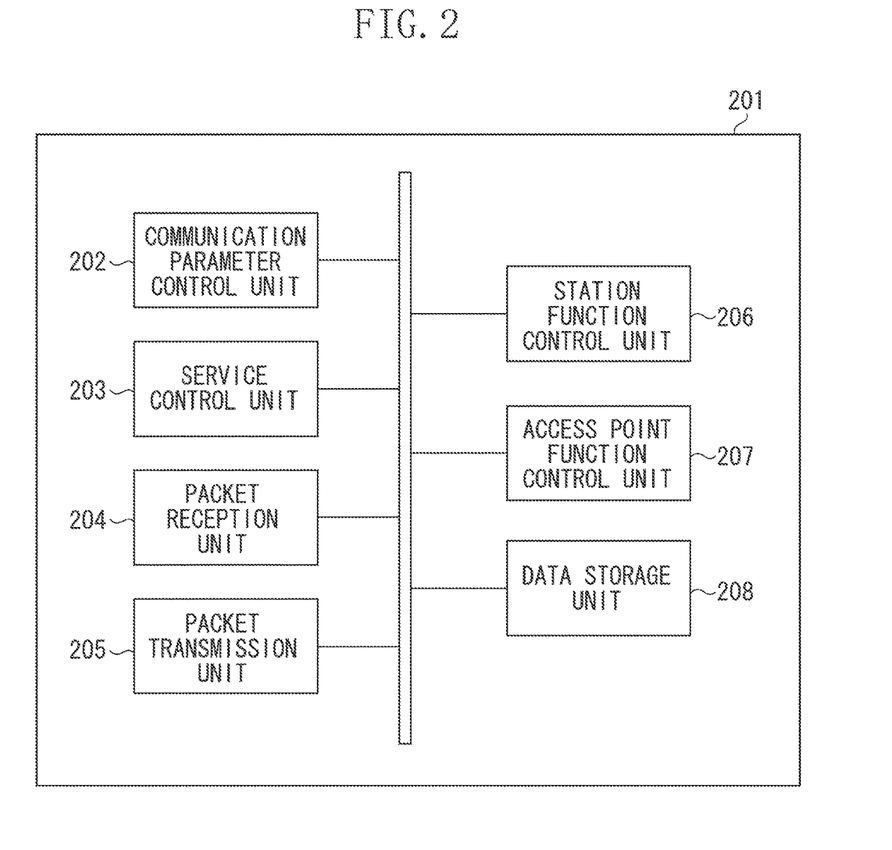
FIG. 2 is a block diagram illustrating a software configuration of the communication apparatus according to an exemplary embodiment.

FIG. 2 is a block diagram illustrating an example of a software function block configuration for implementing communication control functions (described below). According to the present exemplary embodiment, each function block of the communication apparatus 101 is stored as a program in the storage unit 103. The function of each program is implemented when executed by the control unit 102. The control unit 102 implements each function by controlling each hardware component and calculating and processing information based on a control program. A part or all of the function blocks can be implemented by hardware. In such a case, a part or all of the function blocks are configured, for example, as an Application Specific Integrated Circuit (ASIC).

FIG. 2 illustrates an entire software function block configuration 201. A communication parameter control unit 202 performs communication parameter share processing for sharing communication parameters between apparatuses. In the communication parameter share processing, a providing apparatus provides a receiving apparatus with communication parameters for performing wireless communication. The communication parameters include wireless communication parameters required to perform wireless LAN communication, such as a Service Set Identifier (SSID) as a network identifier, encryption method, encryption key, authentication method, and authentication key. The communication parameters can also include a Media Access Control (MAC) address, a passphrase, an Internet Protocol (IP) address for performing communication in the IP layer, and information required for higher level services. The communication parameter share processing performed by the communication parameter control unit 202 can be based on Wi-Fi Protected Setup™ (WPS) or Wi-Fi Direct® defined by Wi-Fi™ Alliance.

A service control unit 203 functions in the application layer. The application layer refers to a service provision layer in the fifth or higher level layers of the Open Systems Interconnection (OSI) reference model. More specifically, the service control unit 203 performs print processing, image streaming processing, file transfer processing, etc. by using the wireless communication performed by the wireless unit 104.

A packet reception unit 204 and a packet transmission unit 205 control reception and transmission of all packets, including communication protocols used in higher level layers. The packet reception unit 204 and the packet transmission unit 205 control the wireless unit 104 to perform packet reception and transmission conforming to the IEEE 802.11 standard with the partner apparatus.

A station function control unit 206 provides a station (STA) function operating as a station in the infrastructure mode defined in the IEEE 802.11 standard, and an STA function operating as a client (CL) defined in the Wi-Fi Direct® standard. When the STA function operates as an STA or CL, the station function control unit 206 performs authentication and encryption processing. An access point function control unit 207 provides an access point (AP) function operating as an AP in the infrastructure mode defined in the IEEE 802.11 standard, and an AP function operating as a group owner (GO) defined in the Wi-Fi Direct® standard. The access point function control unit 207 forms a wireless network, performs authentication and encryption processing on the STA and CL, and manages the STA and CL. A data storage unit 208 performs control for writing and reading the software itself, communication parameters, and bar code information to/from the storage unit 103.

The above-described function blocks are merely examples. A plurality of function blocks can configure one function block, and any one of the function blocks can be divided into a plurality of function blocks for performing a plurality of functions. Alternatively, the communication apparatus 101 can be provided with functions in addition to the above-described function blocks.

Figure 3:
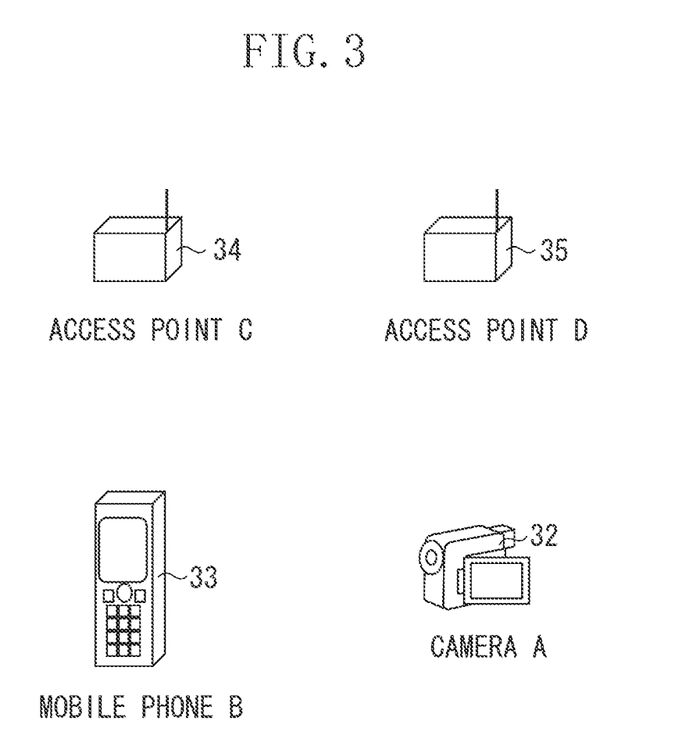
FIG. 3 illustrates a communication system according to an exemplary embodiment.

FIG. 3 illustrates a communication system according to the present exemplary embodiment that includes communication apparatus such as a camera A32, a mobile phone B33, and access points C34 and D35. These communication apparatuses include the hardware and software configurations illustrated in FIGS. 1 and 2, respectively. While the communication apparatuses in the communication system according to the present exemplary embodiment are a camera and a mobile phone, the communication apparatuses can include, for example, a printer, smart phone, personal computer (PC), video camera, smart watch, and personal digital assistant (PDA).

Figure 4:
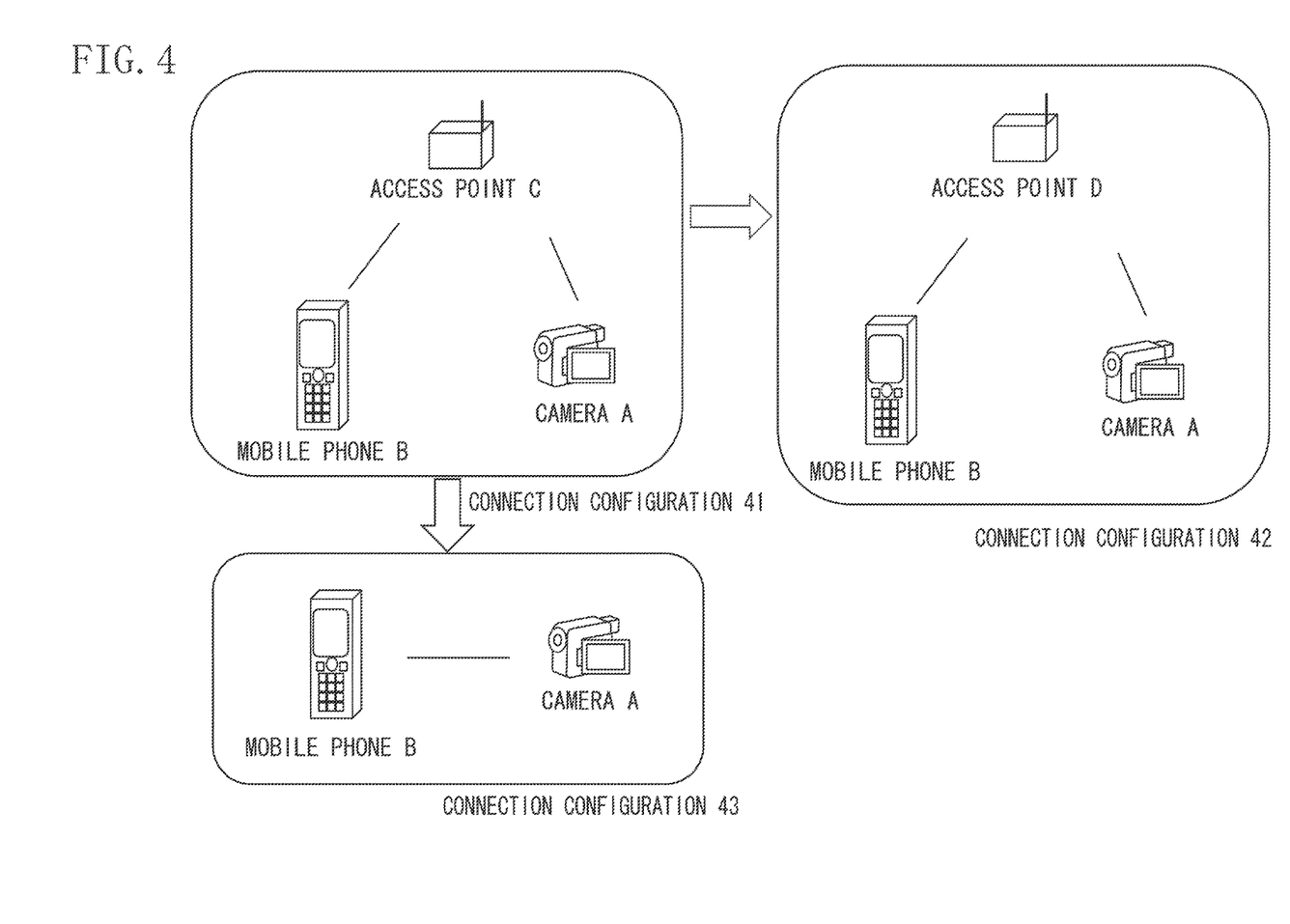
FIG. 4 illustrates switching between connection configurations of the communication apparatus according to an exemplary embodiment.

FIG. 4 schematically illustrates a transition between connection configurations of the communication apparatuses illustrated in FIG. 3. In a connection configuration 41, the camera A and the mobile phone B operate as an STA and connect with a wireless LAN configured by the access point C. In the connection configuration 41, the camera A and the mobile phone B exchange data via the access point C. In a connection configuration 42, the camera A and the mobile phone B operate as an STA and connect with a wireless LAN configured by the access point D. In the connection configuration 42, the camera A and the mobile phone B exchange data via the access point D. In a connection configuration 43, the camera A and the mobile phone B directly communicate with each other without using an access point. In the connection configuration 43, the camera A and the mobile phone B can communicate directly with each other by using the Wi-Fi Direct® standard or by using the ad-hoc mode defined in the IEEE 802.11 standard.

The present exemplary embodiment will be described below centering on operations of each communication apparatus in a transition from the connection configuration 41 to the connection configuration 42, i.e., when switching the access point in use for wireless LAN communication. Operations of each communication apparatus in a transition from the connection configuration 41 to the connection configuration 43 will be described below with reference to a second exemplary embodiment.

Figure 5:
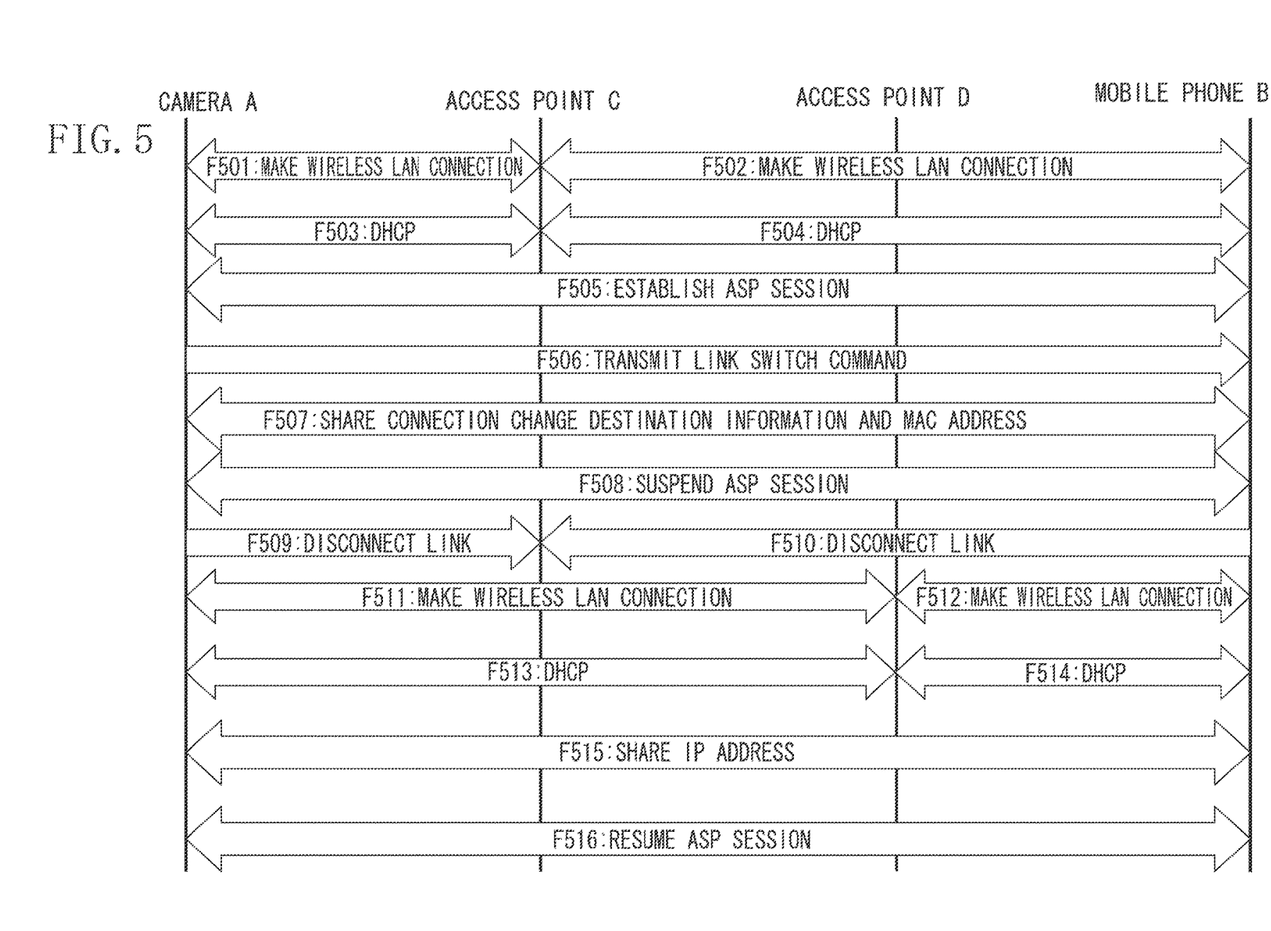
FIG. 5 is a sequence diagram illustrating operations of communication apparatuses according to a first exemplary embodiment.

FIG. 5 is a sequence diagram illustrating operations of each communication apparatus in a transition from the connection configuration 41 to the connection configuration 42 illustrated in FIG. 4. In steps F501 and F502, the camera A and the mobile phone B both make a wireless LAN connection to the access point C to implement the connection configuration 41. In steps F503 and F504, the camera A and the mobile phone B both acquire the IP address from the access point C based on the Dynamic Host Configuration Protocol (DHCP) protocol. While the DHCP protocol is used as an example of a method for IP address setting, the method for IP address setting is not limited thereto as long as an IP address can be set to each communication apparatus. In step F505, when wireless LAN connection is completed and IP address setting is made, an Application Service Platform (ASP) session is established between the camera A and the mobile phone B.

The establishment of an ASP session refers to sharing various information between communication apparatuses and then establishing connections in up to the application layer in the OSI reference model. The shared information includes the MAC address of the session, the identification information of the session, the MAC address of a service, the identification information of the service, the status information of the session, the IP address of each communication apparatus, and a port number and a protocol, etc. used to execute the service. The MAC address of the session refers to the MAC address of a communication apparatus which has generated the identification information of the session. The identification information of a session refers to information for identifying the session and is generated by an apparatus that transmitted a request for establishing a session (Request Session). The apparatus transmitting a request for establishing a session is an apparatus using a service. Such an apparatus is referred to as a seeker. The MAC address of a service refers to the MAC address of a service providing apparatus. The service providing apparatus is referred to as an advertiser. For example, if the service to be provided is a printing service, the service providing apparatus is a printer. If the service to be provided is an image (moving image or still image) display service, the service providing apparatus is an apparatus including a display. The identification information of a service is a value unique to each session for each service, and is information generated by the service providing apparatus. The identification information of a service is referred to as an advertise identifier. The status information of a session refers to information indicating the status of a session established between communication apparatuses, and includes the "Initiate", "Requested", "Open", or "Closed" information. The port number refers to a port number of Transmission Control Protocol (TCP) or User Datagram Protocol (UDP). A protocol refers to information indicating the protocol to be used, such as TCP, UDP, and IP. Before establishment of an ASP session, all of unused ports are closed in communication apparatuses to prohibit communication by application services using these ports. However, after establishment of an ASP session, ports related to the services to be executed are opened to enable communication by application services.

After establishment of an ASP session, various services, including printing services, image display services, file transfer services, video streaming services, are executed on the ASP session. In the connection between the camera A and the mobile phone B, image display services, file transfer services, video streaming service, etc. are executed.

A condition for switching the access point in use for wireless LAN communication occurs during communication for executing a service or after completion of a service. An example of the switching condition is an event that the user of the camera A inputs an access point switch command to the camera A. In step F506, the camera A transmits a packet of a wireless LAN link switch command to the mobile phone B. After the wireless LAN link between the camera A and the mobile phone B is determined to be switched, the camera A and the mobile phone B store in the storage unit 103 various information shared when an ASP session is established in step F505. In step F507, the camera A transmits information for identifying the change destination access point, such as the MAC address, IP address, and SSID, to the mobile phone B. In step F508, the camera A and the mobile phone B suspend the ASP session established in step F505. In steps F509 and F510, after the ASP session is suspended in step F508, the camera A and the mobile phone B disconnect from the access point C. In steps F511 and F512, the camera A and the mobile phone B both make a wireless LAN connection to the access point D. In steps F513 and F514, the camera A and the mobile phone B acquire the IP address from the access point D based on the DHCP protocol. Similar to steps F503 and F504, protocols other than the DHCP protocol can also be used in steps F513 and F514. In step F515, when wireless LAN connection is completed and IP address setting is made, the camera A and the mobile phone B share new IP address information assigned by the access point D. The MAC address of each communication partner apparatus was shared and stored in the storage unit 103 in step F505. Therefore, when sharing the IP address, each apparatus acquires the IP address of the partner apparatus by using as a key the MAC address of the partner apparatus, for example, based on the Reverse Address Resolution Protocol (RARP) protocol. Alternatively, each apparatus can transmit an action frame on the wireless LAN and notify the contents of the IP address to share the IP address with the partner apparatus.

In step F516, after sharing the new IP addresses, the camera A and the mobile phone B resume the ASP session. The resumption of an ASP session refers to reading various information about the ASP session stored in the storage unit 103 in step F507 and, by using the information, returning the ASP session to the state before suspending the ASP session in step F508. While the connection destination of the camera A and the mobile phone B is switched from the access point C to the access point D, the ASP session and the service in execution can be continued without being affected by the access point switching.

Figure 6:
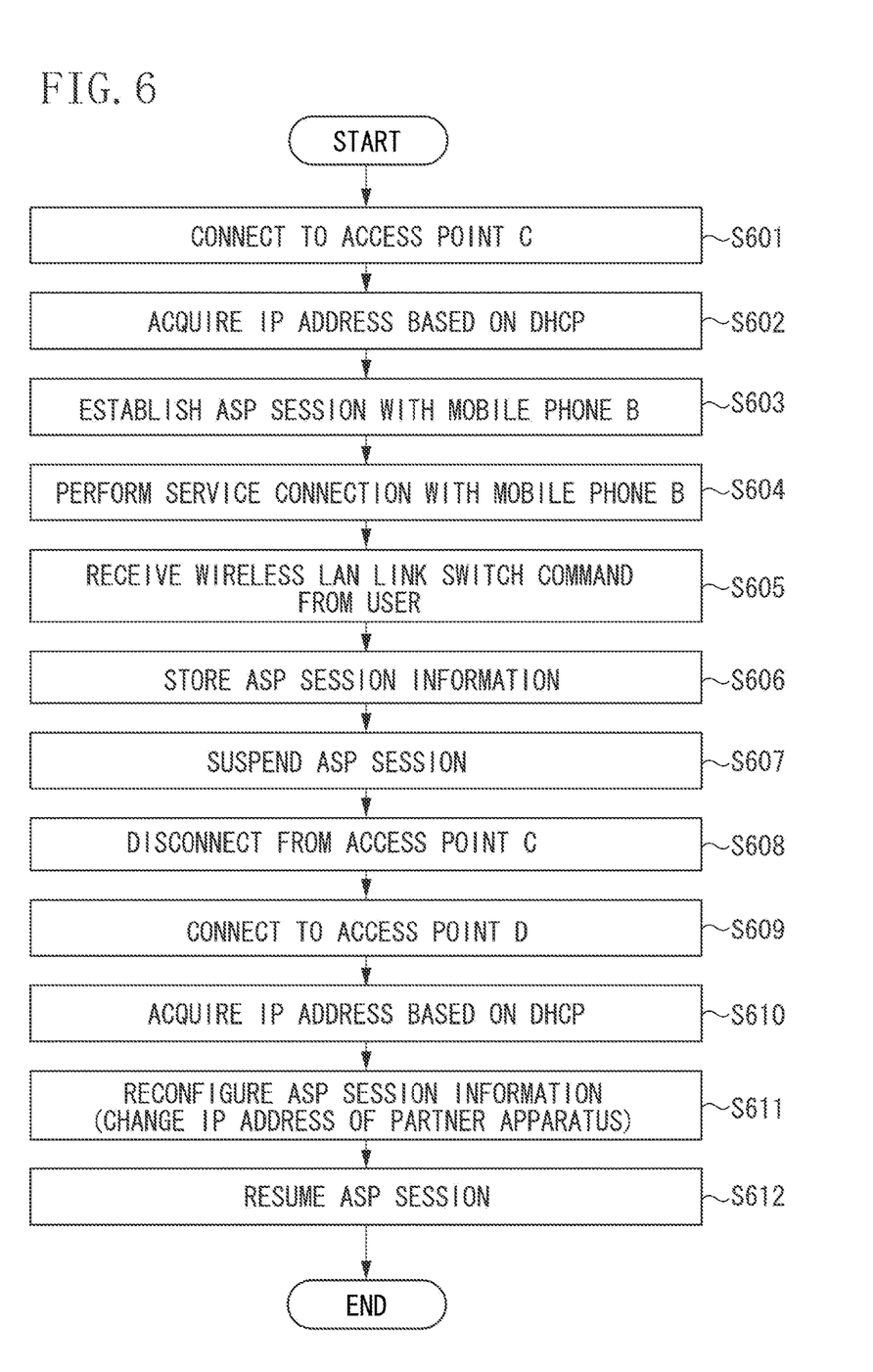
FIG. 6 is a flowchart illustrating operations of a camera according to the first exemplary embodiment.

FIG. 6 is a flowchart illustrating operations of the camera A according to the present exemplary embodiment. Each step illustrated in FIG. 6 is implemented when the control unit 102 of the camera A reads a program stored in the storage unit 103 and then executes it.

In step S601, the camera A makes a wireless LAN connection to the access point C to implement the connection configuration 41. In step S602, the camera A acquires the IP address from the access point C based on the DHCP protocol. In step S603, when wireless LAN connection is completed and IP address setting is made, the camera A and the mobile phones B establish an ASP session therebetween. More specifically, the camera A shares the above-described various information with the mobile phones B, and establishes connections in up to the application layer in the OSI reference model. In step S604, after establishment of the ASP session, the camera A executes desired services (image display services, file transfer services, video streaming services, etc.) on the ASP session. The camera A detects the occurrence of a condition for switching the access point in use for wireless LAN communication during communication for executing a service or after completion of a service. In the example illustrated in FIG. 6, the user of the camera A inputs an access point switch command to the camera A. In step S605, the camera A receives the access point switch command as a wireless LAN link switch command, and detects the occurrence of a condition for switching the access point.

Figure 10:
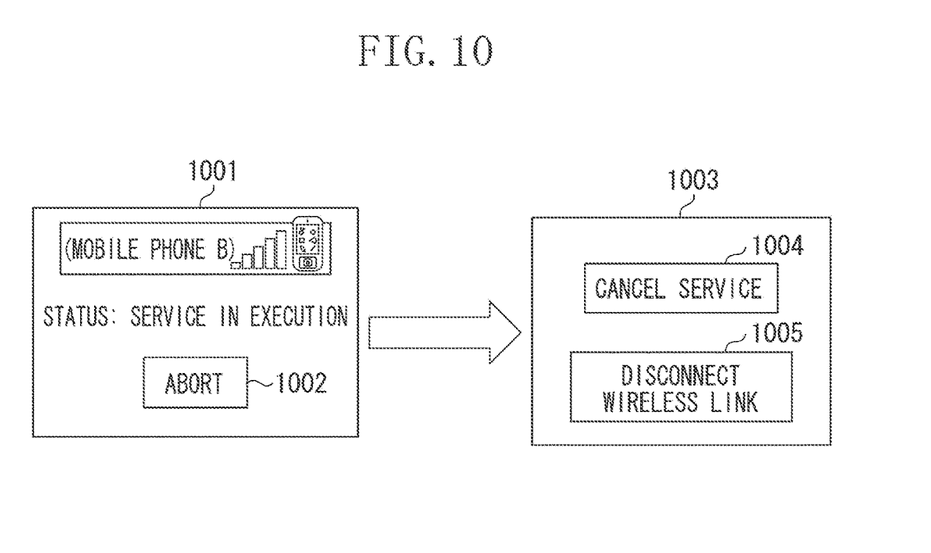
FIG. 10 illustrates examples of screens of the camera according to the present exemplary embodiment.

FIG. 10 illustrates examples of screens displayed on the display unit 105 of the camera A. A screen 1001 is displayed during execution of a service between the camera A and the mobile phones B. The screen 1001 displays the identification information and radio wave intensity of the mobile phone B as a connection partner, and the status of the service. The screen 1001 displays an "Abort" button 1002. When the user selects the button 1002, a screen 1003 is displayed. The screen 1003 displays a "Cancel Service" button 1004 and a "Disconnect Wireless Link" button 1005. When the user selects the button 1004, the camera A disconnects from the wireless LAN and ends the ASP session with the mobile phone B. When the user selects the "Disconnect Wireless Link" button 1005, the processing in step S605 illustrated in FIG. 6 is executed. In other words, the access point in use can be switched while maintaining the ASP session. When the user selects the "Disconnect Wireless Link" button 1005, the camera A can search for change destination access points and then display a screen enabling the user to select a change destination access point from among the searched access points.

Upon receipt of the wireless LAN link switch command in step S605, the camera A transmits a packet of a wireless LAN link switch command to the mobile phone B. In step S606, upon receipt of a positive response to the packet of a link switch command from the mobile phone B, the camera A stores various information about the ASP session established in step S603 in the storage unit 103. Then, the camera A transmits information for identifying the change destination access point to the mobile phone B.

In step S607, the camera A suspends the ASP session. In step S608, after the ASP session is suspended in step S607, the camera A disconnects from the access point C. In step S609, the camera A makes a wireless LAN connection to the access point D. In step S610, upon completion of wireless LAN connection with the access point D, the camera A acquires the IP address from the access point D based on the DHCP protocol. However, the method for IP address setting is not limited to the DHCP protocol. When wireless LAN connection is completed and IP address setting is made, the camera A and the mobile phone B share new IP address information assigned by the access point D. More specifically, the camera A acquires the IP address by using as a key the MAC address of the mobile phone B based on the RARP protocol. In step S611, the camera A updates the information about the IP address of the mobile phone B stored in step S606 to the acquire IP address information. In step S612, after completion of the processing for updating the IP address of the partner apparatus, the camera A resumes the ASP session with the mobile phone B. More specifically, the camera A reads various information related to the ASP session stored in the storage unit 103 in step S606 (information updated in step S611), and re-establishes an ASP session with the mobile phone B by using these pieces of information. While the connection destination of the camera A and the mobile phone B is switched from the access point C to the access point D, the ASP session and the service in execution can be continued without being affected by the access point switching.

When the ASP session is suspended in step S607, the camera A can start a timer and, if the resumption of the ASP session in step S612 is not completed within a predetermined time limit, completely end the ASP session. More specifically, the camera A can delete various information about the ASP session stored in step S606 from the storage unit 103, and subsequently establish a new ASP session. Instead of the predetermined time limit, the number of retrials to be performed if the resumption of the ASP session fails can be limited. If the resumption of the ASP session fails a predetermined number of times, the camera A can completely end the ASP session.

Alternatively, after disconnecting from the access point C in step S608, the camera A can start a timer and, if wireless LAN connection with the access point D in step S609 is not completed within a predetermined time limit, reconnect to the access point C. Then, the camera A can continue the service through wireless LAN communication via the access point C.

As described above, according to the present exemplary embodiment, even when the connection destination access point is switched during service execution with another apparatus through a wireless LAN connection via an access point, the session, once established, for executing a service can be continued.

A second exemplary embodiment will be described below. The present exemplary embodiment described below centers on operations of each communication apparatus in a transition from the connection configuration 41 described above with reference to FIG. 4 to the connection configuration 43. In other words, the following describes operations of each apparatus in a transition from a state in which the camera A and the mobile phone B are connecting to the wireless LAN configured by the access point C to a state of direct communication without using an access point. The hardware and software configurations of the camera A and the mobile phone B are similar to those according to the first exemplary embodiment, and redundant descriptions thereof will be omitted. Only differences from the first exemplary embodiment will be described below.

Figure 7:
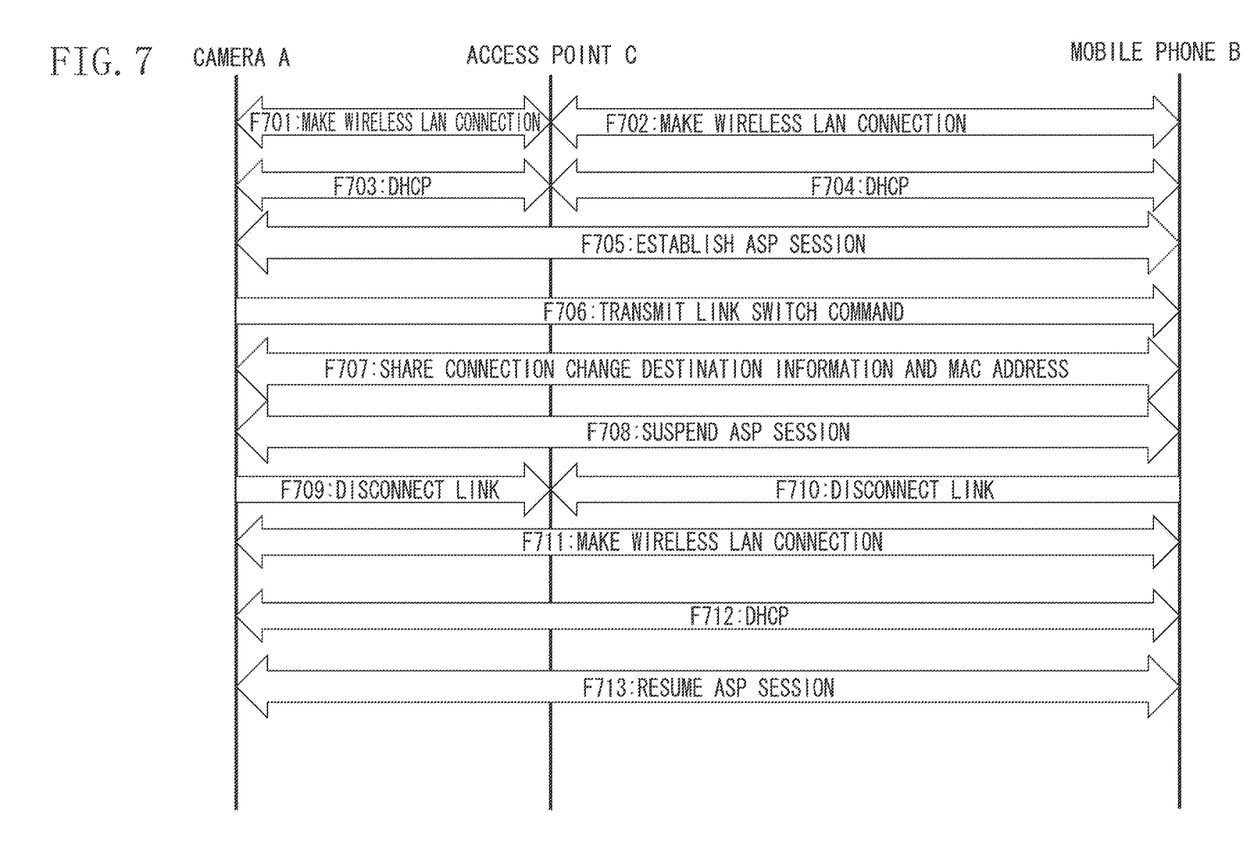
FIG. 7 is a sequence diagram illustrating operations of communication apparatuses according to a second exemplary embodiment.

FIG. 7 is a sequence diagram illustrating operations of each communication apparatus in a transition from the connection configuration 41 illustrated in FIG. 4 to the connection configuration 43. Processing in steps F701 to F705 is similar to the processing in steps F501 to F505 according to the first exemplary embodiment. After the ASP session between the camera A and the mobile phone B is established in step F705, a condition for switching the wireless LAN communication method occurs during communication for executing a service or after completion of a service. More specifically, a condition for switching the communication method from wireless LAN communication via an access point to direct wireless LAN communication without using an access point occurs. An example of a switching condition is an event that the user of the camera A inputs an access point switch command to the camera A. In step F706, the camera A transmits a packet of a wireless LAN link switch command to the mobile phone B. After the wireless LAN link between the camera A and the mobile phone B is determined to be switched, the camera A and the mobile phone B store in the storage unit 103 various information shared when the ASP session was established in step F705. Processing in steps F707 to F710 is similar to the processing in steps F507 to F510.

In step F711, after the camera A and the mobile phone B disconnect from the access point C, the camera A and the mobile phone B communicate directly with each other through a wireless LAN without using an access point. In step F712, the camera A and the mobile phone B determine the IP address based on the DHCP protocol. Similar to the first exemplary embodiment, the IP address can be set by using other methods other than the DHCP protocol. In steps F711 and F712, the camera A and the mobile phone B can communicate directly with each other through a wireless LAN conforming to the Wi-Fi Direct® standard or by using the ad-hoc mode defined in the IEEE 802.11 standard. In step F713, when the wireless LAN link is established and the IP address setting is made, the camera A and the mobile phone B resume the ASP session therebetween. A specific example of the resumption of an ASP session is as described above in the first exemplary embodiment. While the communication method of the camera A and the mobile phone B is switched from a communication method using an access point to direct communication, the ASP session and the service in execution can be continued without being affected by the communication method switching.

Figure 8:
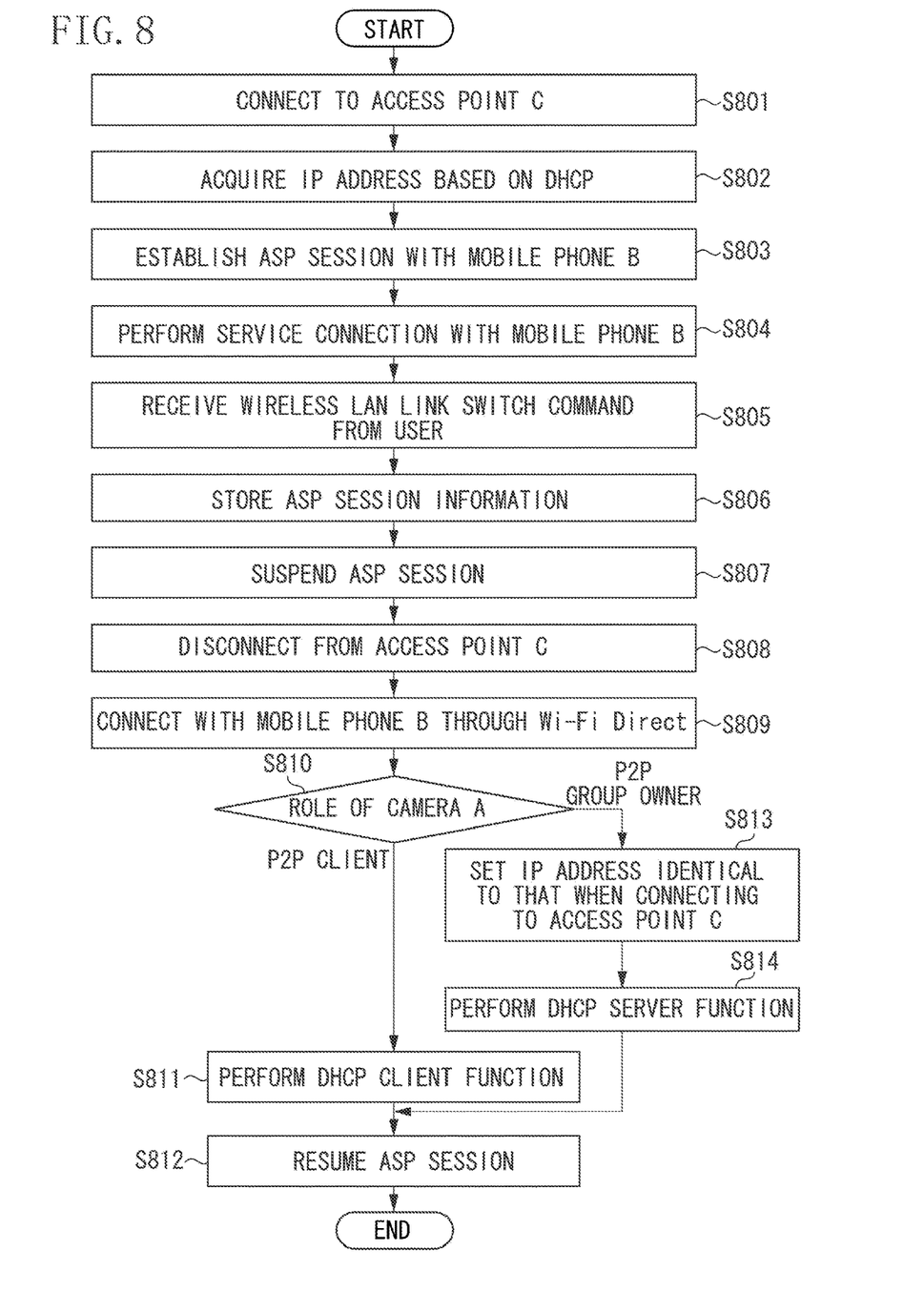
FIG. 8 is a flowchart illustrating operations of a camera according to the second exemplary embodiment.

FIG. 8 is a flowchart illustrating operations of the camera A according to the present exemplary embodiment. Each step illustrated in FIG. 8 is implemented when the control unit 102 of the camera A reads a program stored in the storage unit 103 and then executes it. The example illustrated in FIG. 8 describes processing in which the camera A and the mobile phone B establish an ASP session therebetween by using a communication method using an access point, and then switch the communication method to direct communication conforming to the Wi-Fi Direct® standard.

Processing in steps S801 to S808 is similar to the processing in steps S601 to S608, and redundant descriptions thereof will be omitted. The wireless LAN link switch command in step S805 is a command for switching from a communication method using an access point to the communication method conforming to the Wi-Fi Direct® standard. In step S809, after the camera A disconnects from the access point C, the camera A makes a wireless LAN connection with the mobile phone B conforming to the Wi-Fi Direct® standard. In the Wi-Fi Direct® standard, either the camera A or the mobile phone B operates as a GO to configure a wireless LAN, provide communication parameters, and perform authentication processing. Another apparatus operates as a CL to connect to the wireless LAN configured by the GO, receive communication parameters, and perform processing for being authenticated. In step S809, the camera A and the mobile phone B perform role determination processing for determining which apparatus serves as a GO or CL. In step S810, when the role determination processing is completed, the camera A determines the determined role of the camera A itself.

When the camera A determines that the camera A serves as a CL (P2P Client in step S810), the processing proceeds to step S811. In step S811, the camera A acquires the IP address from the mobile phone B based on the DHCP protocol. When the camera A determines that the camera A serves as a GO (P2P Group Owner in step S810), the processing proceeds to step S813. In step S813, the camera A sets the IP address acquired from the access point C in step S802 to its own IP address, and then sets the IP address of the mobile phone B shared in step S806 to the IP address to be distributed to the mobile phone B. In step S814, the camera A activates a DHCP server function to distribute the IP address to the mobile phone B based on the DHCP protocol. When the processing in step S811 or S814 is completed, the processing proceeds to step S812. In step S812, the camera A resumes the ASP session with the mobile phones B. The resumption of the ASP session is as specifically described in the first exemplary embodiment. While the communication method of the camera A and the mobile phone B is switched from a communication method using an access point to direct communication, the ASP session and the service in execution can be continued without being affected by the communication method switching.

Similar to the first exemplary embodiment, when the ASP session suspended in step S807, the camera A can start a timer and, if the resumption of the ASP session in step S812 is not completed within a predetermined time limit, completely end the ASP session. Instead of the predetermined time limit, the number of retrials to be performed if the resumption of the ASP session fails can be limited. If the resumption of the ASP session fails a predetermined number of times, the camera A can completely end the ASP session.

After disconnecting from the access point C in step S808, the camera A can start a timer and, if a wireless LAN connection with the access point D in step S809 is not completed within a predetermined time limit, reconnect to the access point C. Then, the camera A can continue the service through wireless LAN communication via the access point C.

Figure 9:
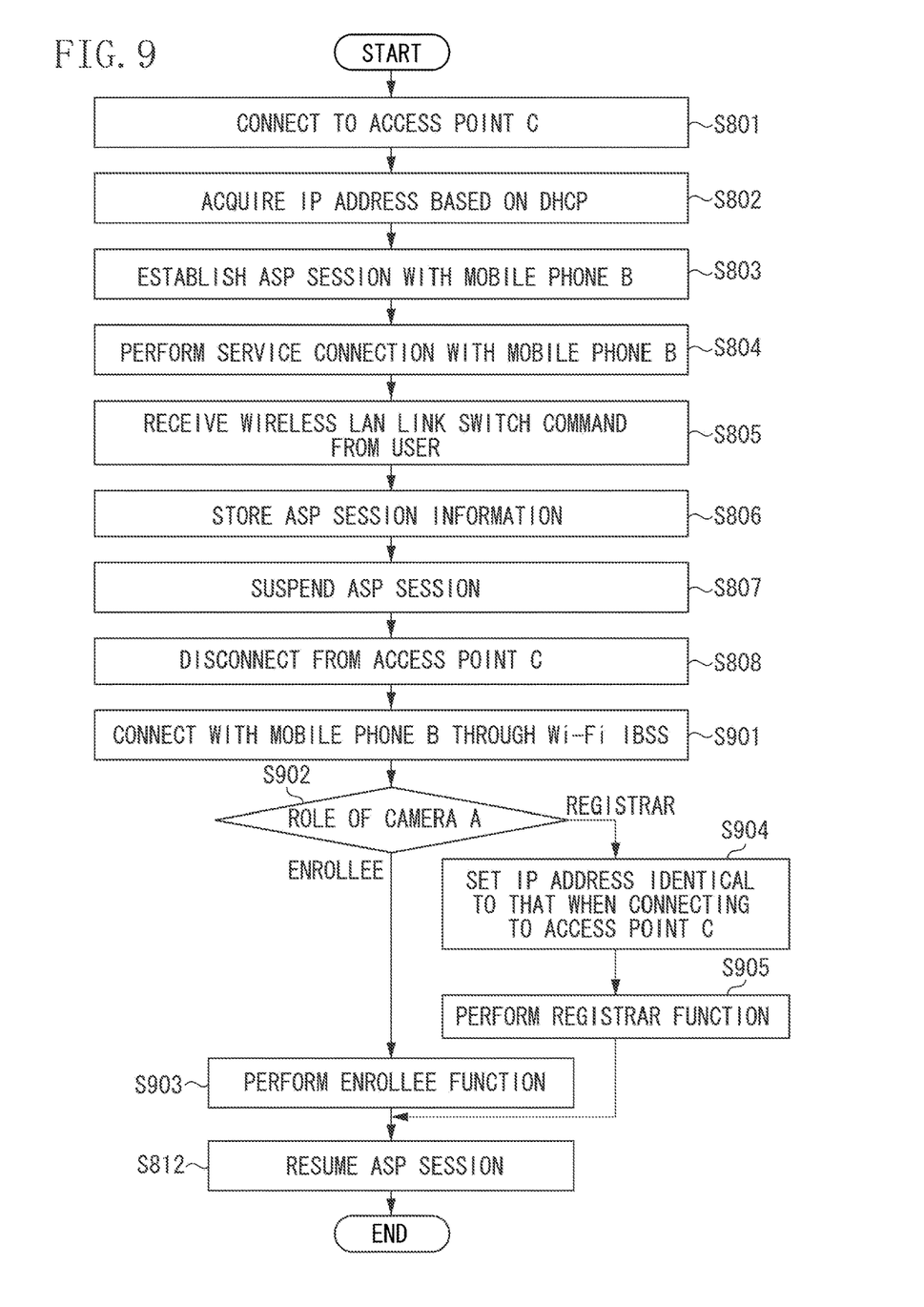
FIG. 9 is a flowchart illustrating operations of the camera according to the second exemplary embodiment.

The example illustrated in FIG. 8 describes processing in which the camera A and the mobile phone B establish an ASP session therebetween by using a communication method using an access point, and then switch the communication method to direct communication conforming to the Wi-Fi Direct® standard. FIG. 9 is a flowchart illustrating operations performed by the camera A in a case where the camera A and the mobile phone B establish an ASP session therebetween by using a communication method using an access point, and then switch the communication method to direct communication conforming to the Wi-Fi® Independent Basic Service Set (IBSS) standard. Operations of the camera A will be described below with reference to FIG. 9.

Processing in steps S801 to S808 illustrated in FIG. 9 is similar to the processing illustrated in FIG. 8, and redundant descriptions thereof will be omitted. In step S901, after the camera A disconnects from the access point C, the camera A makes a wireless LAN connection with the mobile phone B conforming to the Wi-Fi® IBSS standard. In the Wi-Fi® IBSS standard, one apparatus operates as a registrar to provide an enrollee with communication parameters, and another apparatus operates as an enrollee to receive the communication parameters provided by the registrar. In step S901, the camera A and the mobile phone B perform role determination processing for determining which apparatus serves as a registrar or enrollee. In step S902, when the role determination processing is completed, the camera A determines the determined role of the camera A itself. When the camera A determines that the camera A serves as an enrollee (Enrollee in step S902), the processing proceeds to step S903. In step S903, the camera A acquires the IP address from the mobile phone B based on the IP addressing protocol conforming to the Wi-Fi® IBSS standard. When the camera A determines that the camera A serves as a registrar (Registrar in step S902), the processing proceeds to step S904. In step S904, the camera A sets the IP address acquired from the access point C in step S802 to its own IP address, and then sets the IP address of the mobile phone B shared in step S806 to the IP address to be distributed to the mobile phone B. In step S905, the camera A distributes the IP address to the mobile phone B based on the IP addressing protocol conforming to the Wi-Fi® IBSS standard. When the processing in step S903 or S905 is completed, the processing proceeds to step S812. In step S812, the camera A resumes the ASP session with the mobile phones B.

As described above, according to the present exemplary embodiment, even when the communication method is switched from a communication method using an access point to direct communication during service execution with another apparatus through a wireless LAN connection via an access point, the session and the service in execution can be continued. The present exemplary embodiment is also applicable to switching from direct communication to a communication method using an access point.

[Other Exemplary Embodiments]

In the above-described exemplary embodiments, a condition for switching the access point or a condition for switching the wireless LAN communication method occurs when the user issues a switch command. The occurrence timing of these switching conditions is not limited to a switch command by the user. These conditions can be automatically determined by a communication apparatus. For example, the camera A can refer to access point information pre-stored in the storage unit 103 of the camera A. When the radio wave intensity of any access point is stronger than that of the currently connected access point, the camera A can automatically switch the access point. Alternatively, if the camera A confirms that direct communication with the mobile phone B is possible without using an access point, the camera A can automatically switch the communication method. In this case, the camera A can display a screen enabling the user to confirm whether to perform switching on the display unit 105 and then obtain a user's instruction, or display a screen for notifying the user that switching was automatically performed. Alternatively, the camera A can determine the status of the radio wave intensity and the status of the transmission rate of the currently connected access point. If either status gets worse, the camera A automatically can search for other access points and select an access point with a higher radio wave intensity (or a higher transmission rate). Also in this case, the camera A can display a screen enabling the user to confirm whether to perform switching on the display unit 105 and then obtain a user's instruction, or display a screen for notifying the user that switching was automatically performed.

While the above-described exemplary embodiments are based on a wireless LAN conforming to the IEEE 802.11 standard as an example, the communication configuration is not limited to a wireless LAN conforming to IEEE 802.11. Particularly in direct communication without using an access point, other wireless communication methods such as Bluetooth® can be used.

According to the above-described exemplary embodiments, it becomes possible to continue a session, once established, to execute a service even when the access point or wireless communication method in use is switched.

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been described, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-091614, filed Apr. 28, 2016, which is hereby incorporated by reference herein in its entirety.

What is claimed is:

1. A communication apparatus comprising:
one or more memory devices storing instructions; and
one or more processors that execute the instructions and cause the communication apparatus to operate as:
a first connection unit configured to connect to a first access point;
a first establishment unit configured to share address information of the communication apparatus and another communication apparatus, identification information of a service, and identification information of a session, and establish a session with said another communication apparatus via the first access point connected by the first connection unit for executing a service between the communication apparatus and said another communication apparatus;
a detection unit configured to detect an occurrence of a condition for switching from the first access point to a second access point after establishing the session with said another communication apparatus via the first establishment unit;
a storage unit configured to store the address information of the communication apparatus and said another communication apparatus, the identification information of the service, the identification information of the session, and status information of the session;
a disconnection unit configured to disconnect from the first access point based on the detection by the detection unit;
a second connection unit configured to connect to the second access point after the disconnection by the disconnection unit; and
a second establishment unit configured to establish the session with said another communication apparatus via the second access point connected by the second connection unit, using the address information of the communication apparatus and said another communication apparatus, the identification information of the service, the identification information of the session, and the status information of the session stored by the storage unit for continuing the service between the communication apparatus and said another communication apparatus.

2. The communication apparatus according to claim 1, wherein the condition detected by the detection unit is a switch command input by a user.

3. The communication apparatus according to claim 1, wherein the condition detected by the detection unit is based on a radio wave intensity or a transmission rate between the communication apparatus and the first access point.

4. The communication apparatus according to claim 1, wherein, in a case where the connection cannot be performed by the second connection unit within a predetermined time period or a predetermined number of times, the first connection unit reconnects to the first access point.

5. The communication apparatus according to claim 1, wherein the first and the second connection units make a wireless local area network (LAN) connection conforming to the IEEE 802.11 standard.

6. The communication apparatus according to claim 1, wherein the address information is media access control (MAC) address information, the identification information of the service is information generated by a service providing apparatus, and the identification information of the session is information generated by an apparatus using the provided service.

7. The communication apparatus according to claim 1, wherein the service is any one of a printing service, an image display service, a file transfer service, or a video streaming service.

8. A communication apparatus comprising:
one or more memory devices storing instructions; and
one or more processors that execute the instructions and cause the communication apparatus to operate as:
a first connection unit configured to connect to a first access point;
a first establishment unit configured to share address information of the communication apparatus and another communication apparatus, identification information of a service, and identification information of a session, and establish a session with said another communication apparatus via the first access point connected by the first connection unit for executing a service between the communication apparatus and said another communication apparatus;
a detection unit configured to detect an occurrence of a condition for switching from a communication method using the first access point to a communication method for communicating directly with said another communication apparatus after establishing the session with said another communication apparatus via the first establishment unit;
a storage unit configured to store the address information of the communication apparatus and said another communication apparatus, the identification information of the service, the identification information of the session, and status information of the session;
a disconnection unit configured to disconnect from the first access point based on the detection by the detection unit;
a second connection unit configured to connect with said another communication apparatus after the disconnection by the disconnection unit; and
a second establishment unit configured to establish the session with said another communication apparatus connected by the second connection unit by using the address information of the communication apparatus and said another communication apparatus, the identification information of the service, the identification information of the session, and the status information of the session stored by the storage unit for continuing the service between the communication apparatus and said another communication apparatus.

9. The communication apparatus according to claim 8, wherein the condition detected by the detection unit is a switch command input by the user.

10. The communication apparatus according to claim 8, wherein the condition detected by the detection unit is based on a radio wave intensity or a transmission rate between the communication apparatus and the first access point.

11. The communication apparatus according to claim 8, wherein in a case where the connection cannot be performed by the second connection unit within a predetermined time period or a predetermined number of times, the first connection unit reconnects to the first access point.

12. The communication apparatus according to claim 8, wherein the first and the second connection units make a wireless local area network (LAN) connection conforming to the IEEE 802.11 standard.

13. The communication apparatus according to claim 8, wherein the second connection unit connects with the other communication apparatus through a connection conforming to the Wi-Fi Direct® standard.

14. The communication apparatus according to claim 8, wherein the address information is media access control (MAC) address information, the identification information of the service is information generated by a service providing apparatus, and the identification information of the session is information generated by an apparatus using the provided service.

15. The communication apparatus according to claim 8, wherein the service is any one of a printing service, an image display service, a file transfer service, or a video streaming service.

16. A communication method comprising:
connecting a first communication apparatus and a first access point for executing a service between the first communication apparatus and a second communication apparatus, sharing address information of the first and the second communication apparatuses, identification information of the service, and identification information of a session, and establishing a session between the first and the second communication apparatuses via the first access point;
detecting an occurrence of a condition for switching from the first access point to a second access point after establishing the session;
storing the address information of the first and the second communication apparatuses, the identification information of the service, the identification information of the session, and status information of the session;
disconnecting from the first access point based on results of the detecting; and
connecting the first communication apparatus and the second access point after the disconnecting for continuing the service between the first and the second communication apparatuses, establishing the session between the first and the second communication apparatuses via the second access point, using the address information of the first and the second communication apparatuses, the identification information of the service, the identification information of the session, and the status information of the session stored in the storing.

17. A communication method comprising:
connecting a first communication apparatus and a first access point for executing a service between the first communication apparatus and a second communication apparatus, sharing address information of the first and the second communication apparatuses, identification information of the service, and identification information of a session, and establishing a session between the first and the second communication apparatuses via the first access point;
detecting an occurrence of a condition for switching from a communication method using the first access point to a communication method in which the first and the second communication apparatuses communicate directly with each other after establishing the session;
storing the address information of the first and the second communication apparatuses, the identification information of the service, the identification information of the session, and status information of the session; and
disconnecting from the first access point based on results of the detecting;
connecting the first and the second communication apparatuses after the disconnecting for continuing the service between the first and the second communication apparatuses, establishing the session between the first and the second communication apparatuses connected in the connecting, using the address information of the first and the second communication apparatuses, the identification information of the service, the identification information of the session, and the status information of the session stored in the storing.

18. A non-transitory computer-readable storage medium storing computer executable instructions for executing a communication method comprising:
connecting a first communication apparatus and a first access point for executing a service between the first communication apparatus and a second communication apparatus, sharing address information of the first and the second communication apparatuses, identification information of the service, and identification information of a session, and establishing a session between the first and the second communication apparatuses via the first access point;
detecting an occurrence of a condition for switching from the first access point to a second access point after establishing the session;
storing the address information of the first and the second communication apparatuses, the identification information of the service, the identification information of the session, and status information of the session;
disconnecting from the first access point based on a result of the detecting; and
connecting the first communication apparatus and the second access point after the disconnecting for continuing the service between the first and the second communication apparatuses, establishing the session between the first and the second communication apparatuses via the second access point, using the address information of the first and the second communication apparatuses, the identification information of the service, the identification information of the session, and the status information of the session stored in the storing.

19. A non-transitory computer-readable storage medium storing computer executable instructions for executing a communication method comprising:
connecting a first communication apparatus and a first access point for executing a service between the first communication apparatus and a second communication apparatus, sharing address information of the first and the second communication apparatuses, identification information of the service, and identification information of a session, and establishing a session between the first and the second communication apparatuses via the first access point;

detecting an occurrence of a condition for switching from a communication method using the first access point to a communication method in which the first and the second communication apparatuses communicate directly with each other after establishing the session;

storing the address information of the first and the second communication apparatuses, the identification information of the service, the identification information of the session, and status information of the session;

disconnecting from the first access point based on a result of the detecting; and second connecting for connecting the first and the second communication apparatuses after the disconnecting for continuing the service between the first and the second communication apparatuses, establishing the session between the first and the second communication apparatuses connected in the connecting, using the address information of the first and the second communication apparatuses, the identification information of the service, the identification information of the session, and the status information of the session stored in the storing.

* * * * *